United States Patent
Schlansker et al.

[19]

[11] Patent Number: 6,023,751
[45] Date of Patent: Feb. 8, 2000

[54] COMPUTER SYSTEM AND METHOD FOR EVALUATING PREDICATES AND BOOLEAN EXPRESSIONS

[75] Inventors: Michael Schlansker; B. Ramakrishna Rau, both of Los Altos; Vinod Kathail, Cupertino, all of Calif.

[73] Assignee: Hewlett-Packard Company, Palo Alto, Calif.

[21] Appl. No.: 08/400,414

[22] Filed: Mar. 3, 1995

Related U.S. Application Data

[63] Continuation of application No. 08/166,582, Dec. 13, 1993, abandoned.

[51] Int. Cl.⁷ ........................................ G06F 15/00
[52] U.S. Cl. ............................................... 712/1
[58] Field of Search ...................... 395/800; 364/DIG. 1, 364/DIG. 2

[56] References Cited

U.S. PATENT DOCUMENTS

| | | | |
|---|---|---|---|
| 4,212,076 | 7/1980 | Conners | 364/706 |
| 4,251,861 | 2/1981 | Mago | 364/200 |
| 4,615,003 | 9/1986 | Logsdon et al. | 364/200 |
| 4,644,464 | 2/1987 | Logsdon et al. | 364/200 |
| 4,722,071 | 1/1988 | Gates et al. | 364/900 |
| 4,742,252 | 5/1988 | Agrawal | 307/465 |
| 4,747,046 | 5/1988 | Baum et al. | 364/200 |
| 4,774,421 | 9/1988 | Hartmann et al. | 307/465 |
| 4,831,573 | 5/1989 | Norman | 364/716 |
| 4,873,627 | 10/1989 | Baum et al. | 364/200 |
| 4,918,641 | 4/1990 | Jigour et al. | 364/716 |
| 4,931,671 | 6/1990 | Agrawal | 307/465 |
| 5,021,945 | 6/1991 | Morrison et al. | 364/200 |
| 5,046,035 | 9/1991 | Jigour et al. | 364/716 |
| 5,051,947 | 9/1991 | Messenger et al. | 364/900 |
| 5,121,502 | 6/1992 | Rau et al. | 395/800 |
| 5,168,179 | 12/1992 | Shankar | 307/465 |
| 5,239,663 | 8/1993 | Faudemay et al. | 395/800 |
| 5,287,017 | 2/1994 | Narasimhan et al. | 307/465 |
| 5,300,830 | 4/1994 | Hawes | 307/465 |
| 5,305,463 | 4/1994 | Fant et al. | 395/800 |
| 5,309,046 | 5/1994 | Steele | 307/465 |
| 5,349,670 | 9/1994 | Agrawal et al. | 395/775 |
| 5,398,199 | 3/1995 | Lefons | 364/735 |
| 5,450,608 | 9/1995 | Steele | 395/800 |

FOREIGN PATENT DOCUMENTS

| | | | |
|---|---|---|---|
| 2 168 832 | 6/1986 | United Kingdom | G06F 11/00 |

OTHER PUBLICATIONS

De Cegma, Angel L., The Technology of Parallel Processing, Parallel Processing Architectures and VLSI Hardware, vol. I, Prentice–Hall, Englewood Cliffs NJ, 1989 pp. 161–165.

*Primary Examiner*—Paul R. Myers

[57] ABSTRACT

A computer system provides fast evaluation of predicates and Boolean expressions with a set of operations for determining a value in a specified register from a plurality of inputs. The execution of each operation is defined by two functions of the operation's inputs: a result function which yields a result value, and an enable function which determines whether the result value is written to the specified register. To evaluate a Boolean expression with the operations, the register is preset to a Boolean value, e.g. one for an AND reduction, zero for an OR reduction. The operations can then write a Boolean value, e.g. zero for an AND reduction, one for an OR reduction, to the register if each operation's enable function evaluates true. The register then stores the correct value of the expression. The expression's value can be used as predicates to conditionally execute operations in a program. Preferably, the operations are executed in parallel by plural functional units, and the register is capable of accepting multiple values written simultaneously, so long as they are identical.

27 Claims, 2 Drawing Sheets

COMPUTER SYSTEM AND METHOD FOR EVALUATING PREDICATES AND BOOLEAN EXPRESSIONS

CROSS REFERENCE TO RELATED APPLICATION(S)

This is a continuation of copending application Ser. No. 08/166,582 filed on Dec. 13, 1993, now abandoned.

FIELD OF THE INVENTION

This invention relates generally to evaluating expressions and to controlling program execution in a computer system, and more particularly relates to an architectural mechanism and method for fast evaluation of Boolean reductions and predicated execution in a computer system.

BACKGROUND AND SUMMARY OF THE INVENTION

Programs typically include many Boolean-valued expressions. Values produced by these expressions have a number of uses, including as data values, as branch conditions, and, in some computers, as predicates for conditional execution of operations.

A common application for Boolean-valued expressions is to perform a Boolean reduction. That is, to reduce a plurality of values to a single value using Boolean functions, e.g. AND and OR. An example of such an expression for performing a Boolean reduction is as follows:

$$r = u \wedge \neg v \wedge w \wedge x \quad (1)$$

The above expression reduces Boolean values u, the complement of v (represented by $\neg v$), w, and x to a single Boolean value r using the AND function (represented by $\wedge$). In general, any Boolean expression can be expressed in the sum of products form, consisting of a number of AND-reductions followed by an OR-reduction.

Typically, the Boolean values used in programs result from comparisons or relational operations such as less than (<) and greater than (>). Accordingly, the following Boolean expression is more typical of AND-reduction expressions encountered in computer programs.

$$r = (a<b) \wedge \neg(c>d) \wedge (a<c) \wedge (b>d) \quad (2)$$

The speed with which reduction expressions of this type can be evaluated is extremely important to efficient program execution. This is especially true in the context of computer system architectures utilizing instruction-level parallelism, such as very large instruction word (VLIW) or superscalar architectures. Boolean expressions typically are used in computing branch conditions. Thus, evaluation of Boolean expressions is frequently in the critical path of a program. Also, some program transformations for exposing parallelism (i.e. operations that can be executed simultaneously) introduce Boolean reductions. The effectiveness of such transformations depends on how fast these expressions can be evaluated. Some examples of such transformations include combining of multiple branches that exit out of an unrolled loop into a single branch, and height-reduction of control dependence in an unrolled while loop.

In computers that lack the capability to execute operations in parallel, Boolean expressions are generally evaluated in a serial fashion. That is, each operation in the reduction expression is executed one at a time. In general, a purely sequential evaluation of a reduction expression containing n compare operations takes $(2n-1)\alpha$ machine cycles, where a is the number of cycles per compare or AND operation on the computer system. For example, the reduction expression (2) given above would take $7\alpha$ cycles.

In the context of architectures with instruction-level parallelism, compile-time height-reduction techniques are often used to accelerate the evaluation of Boolean expressions. A simple technique for accelerating evaluations is to issue the compare operations in parallel, then perform the reduction using a binary tree of AND operations. Consider, for example, the expression (2) given above. Assuming the processor in the computer system has at least four functional units, the expression can be evaluated as shown in the following table:

TABLE 1

Example of Height Reduction Technique.

| Cycle | Instruction |
|---|---|
| 0 | $r_1 = a < b; r_2 = \neg(c > d); r_3 = a < c; r_4 = b > d;$ |
| $\alpha$ | $r_5 = r_1 \wedge r_2; r_6 = r_3 \wedge r_4;$ |
| $2\alpha$ | $r = r_5 \wedge r_6$ |
| $3\alpha$ | the value, r, is available for use. |

In the example of Table 1, expression (2) is evaluated with a simple height reduction technique in only $3\alpha$ cycles. In general, with this height-reduction technique, a reduction expression containing n compare operations can be evaluated in $(1+(\log_2 n))\alpha$ cycles provided the computer system can execute n operations in parallel. However, even when resources providing additional parallelism are available, this technique still requires at least $(1+(\log_2 n))\alpha$ cycles.

The present invention provides a mechanism and technique for evaluating any reduction expression in effectively only $\alpha$ cycles, provided the computer system has sufficient parallelism. Performance with this method and technique is limited only by the number of functional units (resources) which can execute operations in parallel, and not by any dependencies between individual operations in the expression. Further, in accordance with the invention, the operations can be executed simultaneously or in any desired order. Thus, for example, a compiler is free to overlap the execution of compare operations with other operations in the program, which is important for computer systems with limited resources.

The invention has two primary aspects. According to a first aspect of the invention, one or more registers in a computer system permit multiple operations to simultaneously write a value into that register provided all values written by those operations are identical. In that case, the result stored in that register is well-defined, and equals any one of the values being written to the register. If, however, multiple operations simultaneously write different values into one register, the resulting stored value is undefined. The values written can be Boolean, integer, floating-point, or other values. The register can be a 1-bit register or a bit location in a condition or status register. The register also can be a general-purpose or floating-point register. Not all registers in the computer system need provide this capability for multiple simultaneous writes.

According to a second aspect of the invention, a computer system provides a set of reduction operations. The execution of each reduction operation is, in general, defined by two functions of the operation's input values, a result function and an enable function. The result function determines what value or values, if any, are stored by the operation. The enable function determines whether or not those values are written or stored into a target location or register. Accordingly, the result $r_{out}$ of a reduction operation can be expressed as:

$$r_{out} = F_{out}(r_{in\ 1}, r_{in\ 2}, \ldots, r_{in\ n})$$

$$\text{if } F_{en}(r_{in\ 1}, r_{in\ 2}, \ldots r_{in\ n}) \quad (3)$$

where $F_{out}$ is the result function, and $F_{en}$ is the enable function. The result and enable functions can include at least the following Boolean-valued functions: comparisons of integer or floating-point input values, and functions of Boolean inputs values, such as AND, OR, inverse, and identity functions. The specified target register preferably is of the type that handles multiple simultaneous writes.

In a computer system according to these two aspects of the invention, any reduction expression can be evaluated in effectively only $\alpha$ cycles. Further, any general Boolean expression, expressed in sum of products form, can be evaluated in effectively $2\alpha$ cycles. The reduction expression (2) above, for example, can be evaluated by simultaneously performing four operations which conditionally write, dependent on the result of a comparison, a Boolean zero value into a register which is preset to one as illustrated in the following table.

TABLE 2

Example of Evaluating Expression (2)
According to the Invention.

| Cycles | Instruction |
|---|---|
| 0 | r = 1; (overlapped with previous operations)<br>r = AND −< (a,b);<br>r = AND$_c$ −> (c,d);<br>r = AND −< (a,c); and<br>r = AND −> (b,d). |
| $\alpha$ | The value in r is available for use. |

In the above table, the register r is preset to one. The operations designated AND conditionally write a Boolean zero value into the register r if the result of the specified comparison operation (< or >) is a zero. The operation designated AND$_c$ writes a Boolean zero value into the register r if the complement of the result of the specified comparison operation is a zero. Thus, although more than one of the operations may simultaneously write to the register, all the values that might be written are a zero.

The four simultaneously executed operations effectively evaluate reduction expression (2) in $\alpha$ cycles. (This assumes the operation to preset the register can be overlapped with previous operations, such as, for example, during cycles when one of the functional units would otherwise remain idle. Thus, the preset operation takes effectively no additional execution time.) If the result of any of the comparisons performed by the AND operations, or the complement of the comparison performed by the AND$_c$ operation, is a zero, the register will be set to a zero. As the register r conforms to the first aspect of the invention, multiple operations concurrently setting the register to zero will result in the register being set to a defined value of zero. The register otherwise remains set to one.

Additionally, any general Boolean expression, expressed in sum of products form, can be evaluated in $2\alpha$ cycles. (Again, this assumes the preset operations are overlapped with previous operations so as not to require any additional cycles.) In the first $\alpha$ cycles, each AND term of the expression is performed as a separate AND reduction. In the next $\alpha$ cycles, an OR reduction is performed on the results of the AND reductions to obtain the value of the expression.

The values of the Boolean expressions are particularly useful for predicated execution. Predicated execution of instructions refers to execution which is conditioned on the value of an input, usually a boolean value. For example, on a machine which supports predicated execution, an instruction which adds two input values may be conditioned on whether a third, predicate input has a certain value. The adding of the two input values, or at least the writing of the result of the add function, takes place only when the predicate input has the particular value. Thus, according to a further feature and advantage of the invention, instructions can be predicated on reduction expressions evaluated according to the invention.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
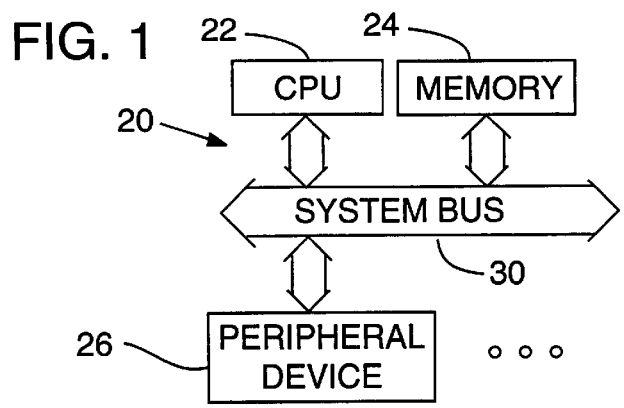
FIG. 1 is a generalized block diagram of a computer system according to a preferred embodiment of the invention.

With reference to FIG. 1, a computer system 20 according to a preferred embodiment of the invention generally comprises a central processing unit (CPU) 22 which is connected to a memory 24 and peripheral devices 26 with a multiple signal system bus 30. The memory 24 is preferably implemented with dynamic random access memory chips, but can be implemented with read only memory chips or other electronic memory devices. The memory 24 stores data and instructions for one or more programs that implement a desired task or calculation on the computer system 20.

Figure 2:
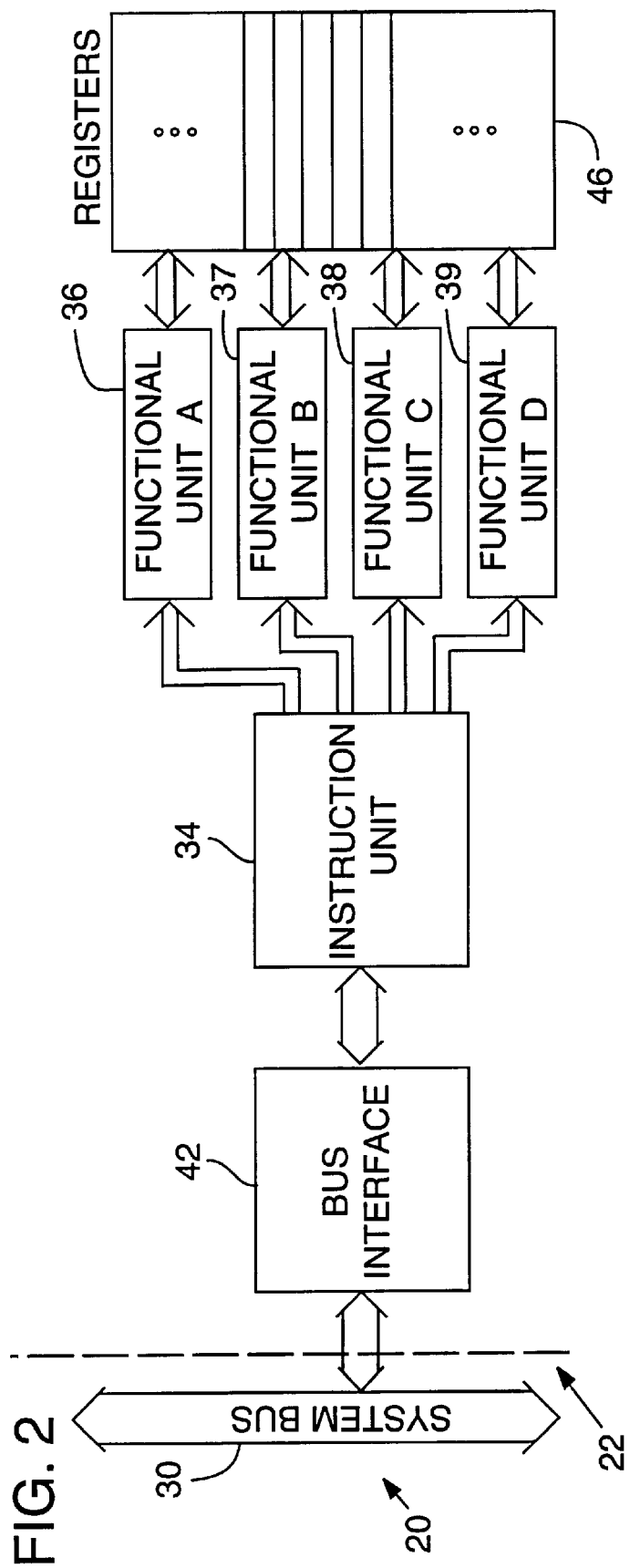
FIG. 2 is a generalized block diagram of a central processing unit in the computer system of FIG. 1 having multiple functional units for instruction level parallelism.

Referring to FIG. 2, the CPU 22 in the computer system 20 preferably provides instruction level parallelism. (In alternative embodiments of the invention, the computer system can have a CPU of a type that provides instruction pipelining.) More specifically, the processor 22 comprises an instruction unit 34 and multiple functional units 36–39 which execute operations concurrently corresponding to the instructions of a program for accomplishing the desired task or calculation. The instructions stored in the memory 24 (FIG. 1) are read into the instruction unit 34. Bus interface circuitry 42 produces the signals necessary to read data and instructions from and write data to the memory 24 on the system bus 30. The instruction unit 34 decodes the instructions and generates control signals which direct a set of functional units 36–39 to execute operations in accordance with the instructions.

The instruction unit 34 is constructed to respond to a predetermined set of instructions (the "instruction set") and form the control signals necessary to carry out corresponding operations with the functional units 36–39. The instruction set generally comprises logic operation instructions, arithmetic operation instructions, and floating point operation instructions. The instruction set also comprises data transfer instructions for transferring data between memory and a set of registers 46 and between registers. In accordance with the invention, some of the operations the instruction unit 34 can direct the functional units to perform are operations for predicated program execution and evaluating Boolean reductions that are described more fully below.

The functional units 36–39 perform operations to execute the instructions as directed by the instruction unit 34. The functional units 36–39 generally read one or two operands used in an operation from registers selected from the registers 46. The functional unit 36–39 also writes one or more results of the operation to a register selected from the registers 46.

The instruction unit 34 and functional units 36–39 in the preferred embodiment are logic circuits implemented with conventional logic gates using conventional logic circuit design techniques to provide the operations described below.

Figure 3:
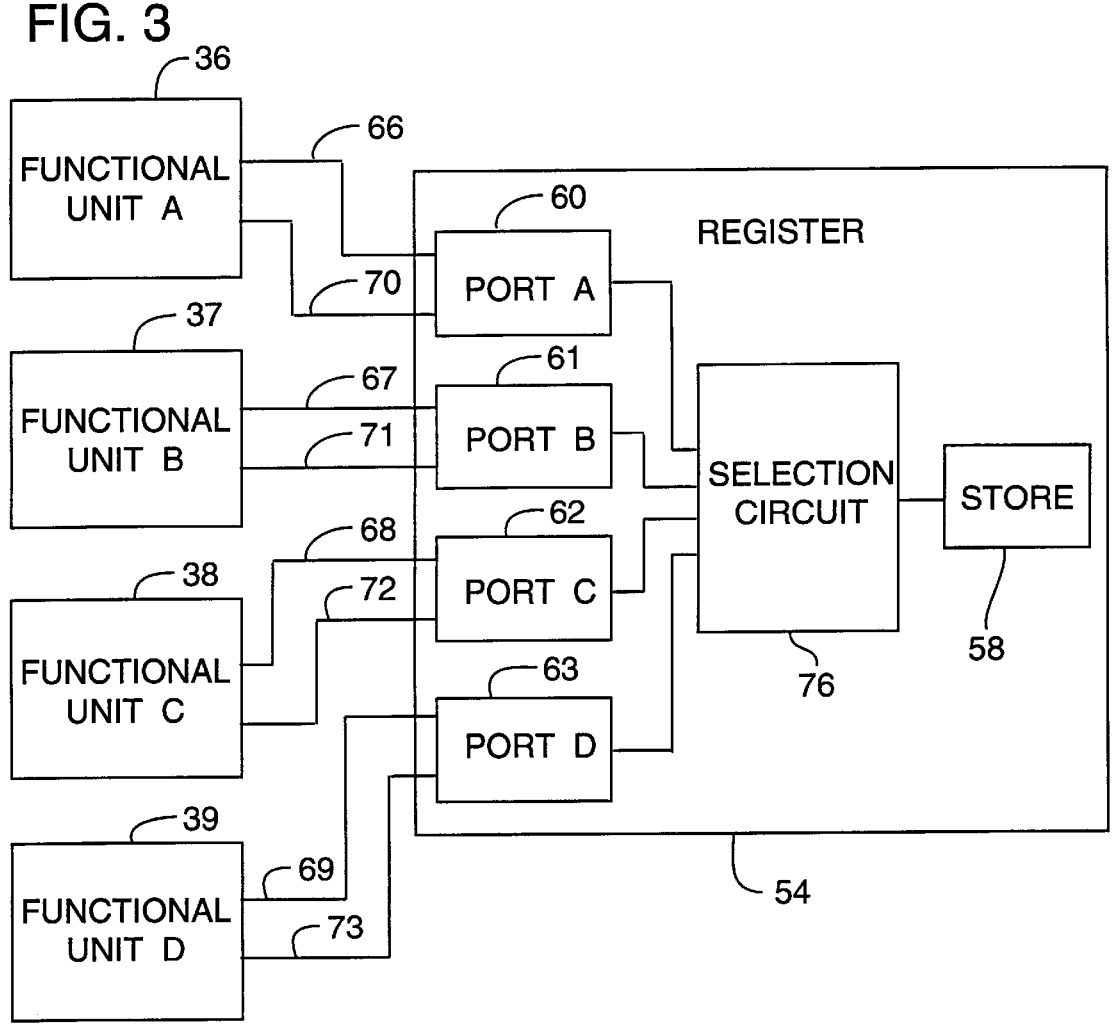
FIG. 3 is a generalized block diagram of a register in the central processing unit of FIG. 2.

Referring now to FIG. 3, at least one of the registers 46 (FIG. 2) stores Boolean-valued operands, and is capable of handling multiple simultaneous writes. Such a register 54 preferably comprises a storage device or circuit ("store") 58 and a number of ports 60–63. (Others of the registers 46 may be dedicated solely to other purposes such as to storing only integer or floating-point values.)

Generally, the store 58 comprises one or more latch, flip-flop or equivalent static or dynamic memory circuits. The store 58 can be implemented to store only a single bit, but also can be implemented to store multi-bit values such as integer or floating-point values. In the case of a multi-bit store, the Boolean-valued operand can be represented by assigning arbitrary bit combinations to each of the Boolean states (e.g. all zeroes representing a Boolean zero, and any other bit combination representing a Boolean one). The multi-bit store implementation can be used to flexibly store Boolean operand and multi-bit integer or floating-point values as may be required by program execution. The store 58 also can be implemented to store a multi-bit predicate vector comprising a plurality of single-bit, Boolean predicate values which may be individually or collectively written.

The ports 60–63 receive values written to the register 54 from the functional units 36–39. The ports 60–63 generally are connected to the functional units 36–39 in a one-to-one relationship with both a data bus 66–69 and a write-enable line 70–73, respectively. To write a value to the register 54 such as the result of an operation, the functional units 36–39 apply the value being written to their data bus 66–69, and assert a write-enable signal on their write-enable line 70–73. In response to the write-enable signal, the ports 60–63 gate the value on their respective data bus 66–69 into the store 58. For example, when the functional unit 37 asserts the write-enable signal of port 61, the value on the data bus 67 for that port is written into the store 58. If the write enable signal for the port 61 is not asserted, the value is not written into the store 58. (In the case of the implementation for storing predicate vectors, separate enable lines and signals for each of the predicate values in the vector can be used.)

When more than one of the functional units 36–39 assert their write-enable signals during concurrently executed operations, multiple values are simultaneously written into the register 54. In prior conventional registers, such multiple simultaneous writes are not permitted and may cause the value stored in the store 58 to be undefined. The register 54, however, operates to store a defined value in the store 58 if all values being written simultaneously to the register 54 are identical. The stored value in that case preferably is identical to the values being written.

The value to be stored when multiple values are written simultaneously is derived by a selection circuit 76 which is connected between the ports 60–63 and the store 58 in the register 54. The selection circuit 76 can derive the stored value in a number of ways. For example, the selection circuit can perform an AND or OR function of the multiple written values, or select one of them arbitrarily to derive the stored value. When the multiple simultaneously written values differ, the result is undefined. Thus, the value stored by the selection circuit 76 for the case of different simultaneously written values is not important.

Referring again to FIG. 2, the functional units 36–39 are operative under control of the instruction unit 34 to execute certain operations corresponding to instructions of a program. The operations that the functional units 36–39 perform under the instruction unit's control include a set of reduction operations useful for predicated program execution and evaluation of Boolean reduction expressions. The reduction operations are each of the following form:

$$r_{out} = \text{operation}(r_{in\ 1}, r_{in\ 2}, \ldots, r_{in\ n}) \qquad (4)$$

In other words, each reduction operation acts on one or more inputs ($r_{in\ 1}, r_{in\ 2}, \ldots, r_{in\ n}$) to determine a new value of a result ($r_{out}$) that is stored in a specified register. More specifically, the execution of each operation is precisely defined by two functions, a result function ($F_{out}$) and an enable function ($F_{on}$), where the result ($r_{out}$) is as follows:

$$r_{out} = F_{out}(r_{in\ 1}, r_{in\ 2}, \ldots, r_{in\ n})$$
$$\text{if } F_{en}(r_{in\ 1}, r_{in\ 2}, \ldots, r_{in\ n}) \qquad (5)$$

The result function ($F_{out}$) determines the new value of a result stored in a specified register, if a result is stored. The enable function ($F_{en}$) calculates a Boolean value which determines whether or not the result is stored in the specified output register.

In one embodiment the result function is Boolean-valued. Specific to each reduction operation is a Boolean-valued result function and a Boolean-valued enable function. Each reduction operation is executed in a functional unit by (1) performing the operation's specific result function on a set of inputs to produce a resulting Boolean value, and (2) performing the operation's enable function which determines whether the Boolean value is written to a specified target register. Examples of the types of Boolean-valued functions which may be specific to a result or enable function include, generally, comparison functions (e.g. greater than, less than, equal to, their complements, and the like) on integer input values, comparison functions on floating point input values, and functions of Boolean input values (e.g. AND, OR, XOR, identity, their complements, and the like).

For each reduction operation that the instruction unit 34 directs one of the functional units 36–39 to execute, the instruction unit 34 specifies the input values (or registers from which the input values are taken) for the operation's specific Boolean-valued result function, and a target register to store any values written by the operation. The specified input value must be appropriate to the operation's particular result function. The specified target register must be capable of storing a Boolean value, and in the preferred embodiment is of the type (register 54) illustrated in FIG. 3 and described above, for handling multiple simultaneous writes.

The enable functions determine whether the result value produced by the result function is written to the target register. Accordingly, each reduction operation can take three actions depending on the combined results of the result and enable functions. The actions include writing a Boolean one value to the target register, writing a Boolean zero value to the target register, and not writing to the target register.

The following table 3 illustrates a truth table for four classes of reduction operations in the preferred embodiment of the invention.

TABLE 3

Truth Table for AND and OR Reduction Operations.

|       | On cond. |     | On complement of cond. |         |
|-------|----------|-----|------------------------|---------|
| cond. | OR       | AND | $OR_c$                 | $AND_c$ |
| 0     | —        | 0   | 1                      | —       |
| 1     | 1        | —   | —                      | 0       |

In table 3, the left-most column represents the states of a "condition" value which is produced as a result of a Boolean-valued comparison function. The other columns represent the actions taken by four classes of reduction operations, OR, AND, $OR_c$, and $AND_c$, for each state of the condition, where "1" represents writing a Boolean one to the target register, "0" represents writing a Boolean zero to the target register, and "--" represents leaving the value in the target register unchanged.

Referring to FIG. 3, the functional units 36–39 perform the above-described AND and OR reduction operations by placing the value shown in the value column of the following Table 4 on its respective data bus 66–69, and asserting its respective write-enable line as shown in the write-enable signal column.

TABLE 4

Execution of AND and OR Reduction Operations.

| Reduction Operation | Result Value = | Write-enable signal = |
|---------------------|----------------|------------------------|
| AND                 | 0              | ¬ condition            |
| $AND_c$             | 0              | condition              |
| OR                  | 1              | condition              |
| $OR_c$              | 1              | ¬ condition            |

The above Table 4 shows the values produced by result and enable functions for each of the four classes of operations from Table 3. The result functions for these operations are constants. As shown in the "value" column, the result functions for the AND and $AND_c$ operation classes always produce a result of zero, while those of the OR and $OR_c$ operation classes always produce a result of one. The "write-enable signal" column shows that the enable functions for these operation classes are the comparison function which produces the condition value, or its complement. More specifically, the enable function for the OR and $AND_c$ reduction operations classes is a specified Boolean-valued comparison function (the comparison function which produces the condition). The enable function of the $OR_c$ and AND reduction operation classes is the complement of the specified Boolean-valued comparison function.

The foregoing Table 3 illustrates four classes of reduction operations that are provided in the preferred embodiment of the invention, specifically the AND, $AND_c$, OR, and $OR_c$ reduction operations classes. Reduction operations in the AND and $AND_c$ classes are useful for evaluating AND reduction expressions. Reduction operations in the OR and $OR_c$ classes are useful for evaluating OR reduction expressions. For example, the AND reduction expression (2), which again is as follows:

$$r = (a<b) \wedge \neg(c>d) \wedge (a<c) \wedge (b>d) \qquad (2)$$

can be evaluated with the following four AND and $AND_c$ class reduction operations:

$$r = AND\text{-}<(a,b); \qquad (6)$$

$$r = AND_c\text{-}>(c,d); \qquad (7)$$

$$r = AND\text{-}<(a,c); \text{ and} \qquad (8)$$

$$r = AND\text{-}>(b,d). \qquad (9)$$

The above reduction operations (6–9) each consist of an operation-specific comparison function (< or >) on two specified input values (in parentheses), and an operation-specific reduction function (AND or $AND_c$) which targets a specified register (r). Each reduction operation's comparison function produces a Boolean valued condition. As shown in Tables 3 and 4 above, each reduction operation's enable function then determines, based on the condition, whether a Boolean zero is written to the target register. Note that reduction operations (6) and (8) are the same reduction operation, but specify different input values.

To evaluate the AND reduction expression (2) with the reduction operations (6–9), the register (r) is first preset to a Boolean one value. Then, the reduction operations (6–9) are each executed. Preferably, though not necessarily, the reduction operations are executed in parallel by the functional units 36–39. If the comparison function of any AND reduction operation produces a zero, then a zero is written to the target register. Also, if the comparison operation portion of the $AND_c$ produces a one (the complement of the comparison is a zero), then a zero is written to the target register. Accordingly, after all reduction operations (6)–(9) have been executed, the target register will contain a one if all terms of the AND reduction expression (2) were true, and otherwise will contain a zero (effectively evaluating the expression (2)). As shown in Table 2 above, when the reduction operations (6–9) are executed in parallel the expression (2) is evaluated in effectively only a cycles of the computer system 20.

In an alternative embodiment of the invention, reduction operations determine the value written into the target register based on a Boolean-valued predicate input, as well as the condition value produced by a comparison function. In this alternative embodiment, the instruction unit 34 specifies a predicate value (or a register containing the predicate value) for each reduction operation, in addition to the operation's input value or values and target register. The following Table 4 illustrates some exemplary classes of reduction operations in this alternative embodiment:

TABLE 5

Truth Table of Reduction Operation with Predicate Input.

| P-IN | Cond. | On Condition | | | | On complement of cond. | | | |
|---|---|---|---|---|---|---|---|---|---|
| | | U | C | OR | AND | $U_c$ | $C_c$ | $OR_c$ | $AND_c$ |
| 0 | 0 | 0 | — | — | — | 0 | — | — | — |
| 0 | 1 | 0 | — | — | — | 0 | — | — | — |
| 1 | 0 | 0 | 0 | — | 0 | 1 | 1 | 1 | — |
| 1 | 1 | 1 | 1 | 1 | — | 0 | 0 | — | 0 |

Table 4 illustrates eight classes of reduction operations, including the unconditional (U), conditional (C), OR, and AND classes, and their complements ($U_c$, $C_c$, $OR_c$, $AND_c$). The unconditional classes (U, $U_c$) write into the target register the Boolean AND function of the predicate input and the condition (or its complement). The conditional class writes the condition into the target register dependent on the predicate input. Finally, the OR and AND classes perform as shown in Table 3 dependent on the predicate input. Again, as with the reduction operations shown in Table 3, the execution of each of these reduction operations is precisely defined by a result function which produces a result value, and an enable function which determines whether the result value is written to a specified target register.

With reduction operations of types shown in Table 5, the performance of a set of reduction operations that evaluate a reduction expression can be conditioned on the value of a predicate input contained in a specified register. For example, a set of reduction operations including a conditional class operation for presetting a target register and two or more AND class operations can be set up to evaluate an AND reduction expression (e.g. expression (2)) if a specified predicate input is one, and do nothing if the predicate input is zero.

The Boolean value resulting from the execution of a set of reduction operations, which is stored in the operation's target register after the operations are executed, is particularly useful for predicated execution of operations in a program. In the preferred embodiment of the invention, operations may specify a register in which a Boolean predicate value is stored. The execution of the operation is then conditioned on the predicate value. In the preferred embodiment, the operations are executed only if their specified predicate value is a one.

In a further alternative embodiment, a set of reduction operations is provided which each produce multiple results in a same operation from a given set of input values. As such, the reduction operations with multiple results take the form:

$$r_{out,1}, r_{out,2}, \ldots, r_{out,m} = op(r_{in,1}, r_{in,2}, \ldots, r_{in,n}) \qquad (10)$$

where the multiple result values ($r_{out,1}, r_{out,2}, \ldots, r_{out,m}$) are produced by executing the operation on the set of input values ($r_{in,1}, r_{in,2}, \ldots, r_{in,n}$). The execution of these reduction operations is precisely defined by two functions ($F_{out,i}, F_{en,i}$) for each of the multiple result values. More particularly, for each i, the result ($r_{out,i}$) takes on the value:

$$r_{out,i} = F_{out,i}(r_{in,1}, r_{in,2}, \ldots, r_{in,n})$$

$$\text{if } F_{en,i}(r_{in,1}, r_{in,2}, \ldots, r_{in,n}) \qquad (11)$$

Reduction operations of the type which produce multiple results are particularly useful in situations where more than one reduction expression using the same set of conditions are to be evaluated. For example, in some situations, it may be necessary to evaluate an AND reduction expression of a set of four comparisons, and an OR reduction expression of the same set of comparisons. In this further alternative embodiment, both reduction expressions can be evaluated simultaneously with only four functional units. The four functional units execute four reduction operations, each having an AND and an OR reduction function for writing to two separate target registers, respectively. This technique is particularly useful for calculating two result predicates used for predicated execution of operations from the true and false side of a conditional branch.

Having described and illustrated the principles of our invention with reference to a preferred embodiment, it will be recognized that the invention can be modified in arrangement and detail without departing from such principles. For example, while the illustrated embodiment is an instruction-level parallel computer system, the invention also is applicable to multi-processing computer systems (having separate processors for executing operations rather than separate functional units within a processor). In such a multi-processing computer system embodiment, reduction expressions are evaluated by executing a set of reduction operations, each on a separate processor, between adjacent synchronization points. The reduction operations form the value of the expression in a storage register that handles multiple simultaneous writes.

As a further example, the Boolean-valued comparison function associated with a reduction expression can be performed separately from the reduction operations that evaluate the expression. More specifically, the Boolean-valued comparison functions can be performed in a first set of operations to form a set of the conditions for a desired reduction expression. Then, a second set of reduction operations is performed to reduce the conditions to a final value for the expression. Note, that this still provides advantages over the prior height reduction techniques, as the reduction functions can be performed simultaneously rather than as a binary tree of two input AND operations.

As yet a further example, reduction operations according to the invention may operate upon vectors, each of which comprises a plurality of Boolean values. Such vectors can serve as input values, predicate values, and/or results of a reduction operation's functions.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of evaluating Boolean expressions and predicates in a computer system having a processor with an instruction unit for decoding instructions of an instruction set, a functional unit for executing operations specified in the decoded instructions, and a set of registers, the method comprising the steps of:

decoding instructions of a program in the instruction unit, the program's instructions being selected from the instruction set;

executing operations specified by the decoded instructions in the functional unit, the executing of a corresponding reduction operation specified by one of the decoded instructions in any one of the at least one functional unit comprising the steps of:

retrieving at least one instruction-specified input value for the reduction operation;

producing a Boolean result value having a first instruction-specified state;

performing an instruction-specified condition function of one or more of the input values of the operation to produce a Boolean condition value, wherein the Boolean condition value is false for at least one combination of the input values; and conditionally writing the result value in an instruction-specified location in the set of registers if the Boolean condition value is a second instruction-specified state.

2. The method of claim 1 wherein the reduction operation is an AND reduction operation for which the first instruction-specified state is true.

3. The method of claim 1 wherein the reduction operation is an OR reduction operation for which the first instruction-specified state is false.

4. The method of claim 1 wherein the reduction operation is a complement reduction operation for which the second instruction-specified state is false.

5. The method of claim 1 wherein the reduction operation is a non-complement reduction operation for which the second instruction-specified state is true.

6. The method of claim 1 wherein the reduction operation is a multiple output reduction operation, the step of executing the multiple output reduction operation comprising the step of:

conditionally writing the result value in a plurality of instruction-specified locations in the set of registers if the Boolean condition value is the second instruction-specified state.

7. The method of claim 1 wherein said instruction-specified condition function is a Boolean function of at least two input values of the reduction operation.

8. The method of claim 1 wherein said at least one input value includes a Boolean predicate value, and the step of executing the reduction operation further comprises the step of:

predicating the execution of the reduction operation on the state of the Boolean predicate value.

9. The method of claim 1 further comprising the steps of:

executing a first operation and a set of two or more reduction operations for a subset of the program's instructions to evaluate a Boolean expression, wherein the execution of said operations comprises:

executing the first operation to write a Boolean value having a first state in an instruction-specified location in the set of registers;

executing the set of reduction operations, each of which conditionally writes a Boolean value having a second state in the specified location if the Boolean condition value produced by the condition function of the operation is an instruction-specified state, whereby the value stored in the specified location is the value of the Boolean expression.

10. The method of claim 9 wherein the set of reduction operations are AND reduction operations for which the first instruction-specified state is true, and wherein the value written by the first operation is false.

11. The method of claim 9 wherein the set of reduction operations are OR reduction operations for which the first instruction-specified state is false, and wherein the value written by the first operation is true.

12. The method of claim 9 wherein at least one of the set of reduction operations is a complement reduction operation for which the second instruction-specified state is false.

13. The method of claim 9 wherein at least one of the set of reduction operations is a non-complement reduction operation for which the second instruction-specified state is true.

14. The method of claim 9 wherein at least one of the set of reduction operations is a multiple output reduction operation, the step of executing the multiple output reduction operation comprising the step of:

conditionally writing the result value of the multiple output reduction operation in a plurality of instruction-specified locations in the set of registers if the Boolean condition value is the second instruction-specified state.

15. The method of claim 9 wherein said instruction-specified condition function of at least one of the set of reduction operations is a Boolean function of at least two inputs of said reduction operation.

16. The method of claim 9 wherein said at least one input value of at least one of the set of reduction operations includes a Boolean predicate value, and the step of executing said reduction operation further comprises the step of:

predicating the execution of said reduction operation on the state of the Boolean predicate value.

17. The method of claim 9 in a computer system having a processor with a plurality of functional units for concurrently executing operations specified in the decoded instructions, and at least one register in the set of registers capable of storing a value having a defined state when written simultaneously by more than one of the functional units, the method further comprising the step of concurrently executing the set of reduction operations in the functional units.

18. A computer system comprising:

a plurality of registers for storing values;

a functional unit coupled to the registers and operating to execute a plurality of operations corresponding to the instructions of an instruction set for the computer system, the operations comprising a reduction operation;

an instruction unit for controlling the functional unit to execute operations responsive to the instructions of a program, and the functional unit executing the reduction operation by performing the steps of:

retrieving at least one instruction-specified input value for the reduction operation;

producing a Boolean result value having a first instruction-specified state;

performing an instruction-specified condition function of one or more of the input values of the operation to produce a Boolean condition value, wherein the Boolean condition value is false for at least one combination of the input values; and conditionally writing the result value in an instruction-specified location in the set of registers if the Boolean condition value is a second instruction-specified state.

19. The computer system of claim 18 further comprising:

a plurality of functional units coupled to the registers and each operating to execute a plurality of operations corresponding to the instructions of an instruction set for the computer system, the operations comprising a reduction operation; and wherein the plurality of registers comprises a register for accepting multiple values written simultaneously by more than one of the functional units, the register being operative to store a value based on one or more of multiple Boolean values simultaneously written to the register when each of the Boolean values written to the register are identical.

20. The computer system of claim 18 further comprising:

a plurality of functional units coupled to the registers and each operating to execute a plurality of operations corresponding to the instructions of an instruction set for the computer system, the operations comprising a reduction operation; and at least one of the registers having a plurality of input ports for accepting multiple simultaneously written values, the input ports being connected to the functional units in a one-to-one relationship for receiving a value and a write enable signal from each functional unit, the value received from a functional unit being written to the register when the functional unit's write enable signal is asserted;

the functional units, when executing a reduction operation that specifies a location in the register, sending the Boolean result value to the register and asserting the write enable signal if the Boolean condition value is the second instruction-specified state; and means for deriving the value to store in the location when multiple identical values are written to the register simultaneously by the functional units.

21. The method of claim 18 wherein the reduction operation is an AND reduction operation for which the first instruction-specified state is true.

22. The method of claim 18 wherein the reduction operation is an OR reduction operation for which the first instruction-specified state is false.

23. The method of claim 18 wherein the reduction operation is a complement reduction operation for which the second instruction-specified state is false.

24. The method of claim 18 wherein the reduction operation is a non-complement reduction operation for which the second instruction-specified state is true.

25. The method of claim 18 wherein the reduction operation is a multiple output reduction operation, the functional unit executing the multiple output reduction operation by performing the step of conditionally writing the result value in a plurality of instruction-specified locations in the set of registers if the Boolean condition value is the second instruction-specified state.

26. The method of claim 18 wherein said instruction-specified condition function is a Boolean function of at least two input values of the reduction operation.

27. The method of claim 18 wherein said at least one input value includes a Boolean predicate value, the functional unit executing the reduction operation by performing the step of predicating the execution of the reduction operation on the state of the Boolean predicate value.

* * * * *